United States Patent [19]
Aitken et al.

[11] Patent Number: 5,427,643
[45] Date of Patent: Jun. 27, 1995

[54] METHOD OF USING AN ADHESIVE TAPE FOR OVERCOATING SPLICES IN POLYMER COATED METAL TAPES AND METHOD OF USING THE SAME

[75] Inventors: Hal G. S. Aitken, Pickering; Richard W. Demianyk, Winnipeg, both of Canada

[73] Assignee: Alcatel Canada Wire Inc., Ontario, Canada

[21] Appl. No.: 178,048

[22] Filed: Jan. 6, 1994

[30] Foreign Application Priority Data

Feb. 2, 1993 [CA] Canada ................................. 2088619

[51] Int. Cl.⁶ ............................................. B29C 65/02
[52] U.S. Cl. ..................... 156/304.5; 156/304.6; 156/157; 428/40; 428/355
[58] Field of Search ............... 428/40, 343, 344, 352, 428/353, 354, 355, 356; 156/304.5, 304.6, 305, 306.6, 307.7, 157; 228/171, 203

[56] References Cited
U.S. PATENT DOCUMENTS

| | | | |
|---|---|---|---|
| 4,319,938 | 3/1982 | Vives | 156/49 |
| 4,358,494 | 11/1982 | Akimoto et al. | 428/343 X |
| 4,545,843 | 10/1985 | Bray | 428/354 X |
| 4,699,824 | 10/1987 | Pufahl | 428/337 X |
| 4,759,816 | 7/1988 | Kasper et al. | 428/352 X |

*Primary Examiner*—Daniel R. Zirker
*Attorney, Agent, or Firm*—Ware, Fressola, Van der Sluys & Adolphson

[57] ABSTRACT

An adhesive tape is provided for overcoating splices in polymer coated metal tapes, which comprises a plastic film that serves as recoating material, a layer of adhesive applied to one face of this film and covered by a releasing tape which is peeled-off when required to expose the adhesive tape which is then applied onto the area of the splice to overcoat the same. The adhesive is crosslinkable by application of heat and is crosslinked during a subsequent cable jacketing operation, thereby forming a strong bond between the non-coated metal tape in the splice area and the recoating plastic film.

11 Claims, 2 Drawing Sheets

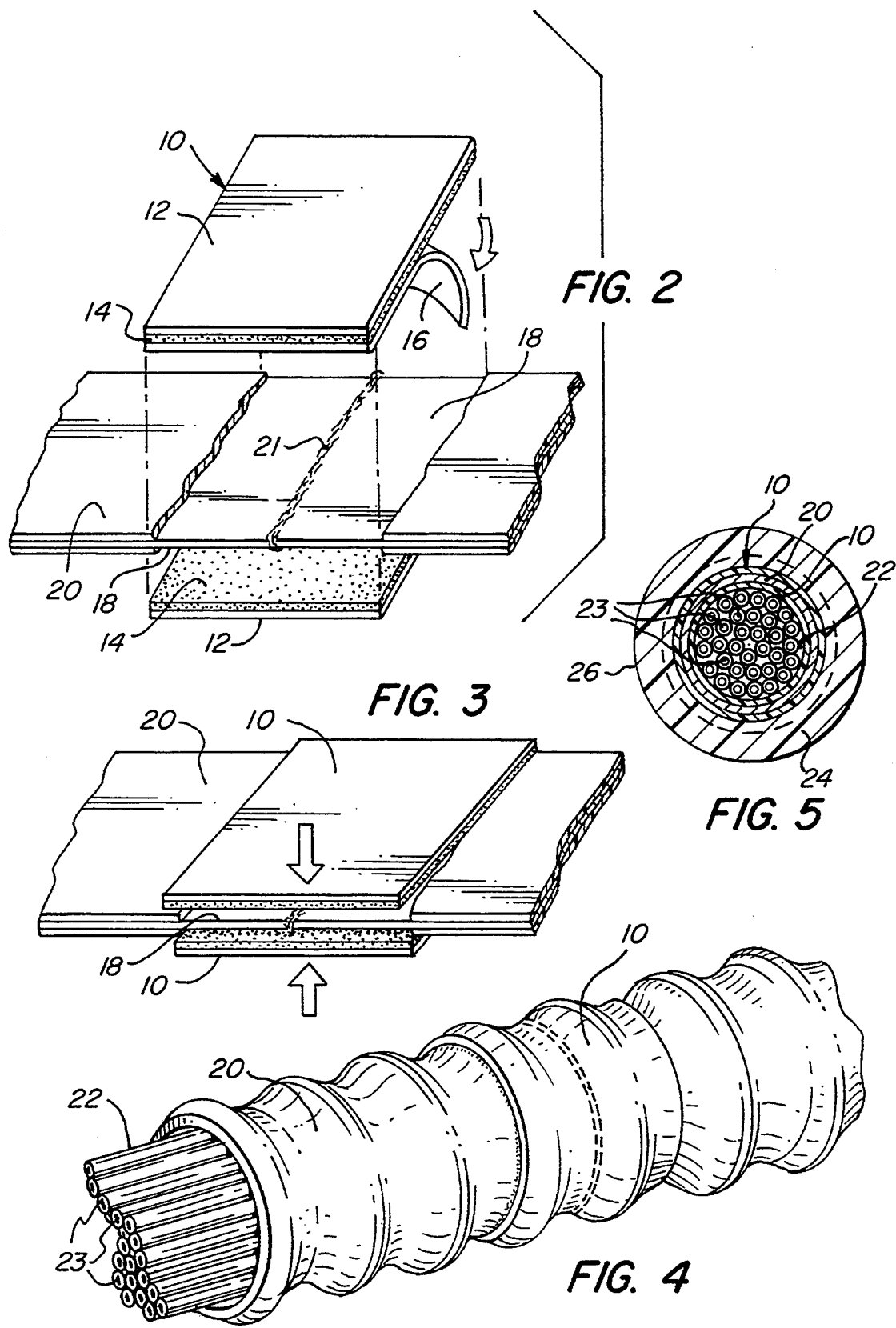

METHOD OF USING AN ADHESIVE TAPE FOR OVERCOATING SPLICES IN POLYMER COATED METAL TAPES AND METHOD OF USING THE SAME

BACKGROUND OF THE INVENTION

This invention relates to the manner in which splices in polymer coated metal tapes are recoated. More particularly, it relates to an adhesive tape for overcoating the splices in polymer coated metal tapes and thereby recoating the same in the area where the polymer coating is lost when weld splices are made.

The use of polymer coated metal tapes in electrical cable constructions is well known. For example such metal tapes are commonly used as shields in communication cables and, as such, they are generally known as shielding tapes. Plastic coated aluminum tape is preferably used for this purpose, however plastic coated steel tapes or plastic coated copper tapes or combinations of various plastic coated metal tapes are also well known.

A typical manufacturing line for the manufacture of tape shielded cable requires a payoff for the tape; a tape splicing station when the ends of the individual tapes are spliced or joined together, usually by spot welding or other butt-jointing techniques; a device to accumulate tape, while splicing on a new length of tape is performed; if necessary, a device for corrugating the tape which is then passed through a conventional device that guides the cable core while having the corrugated tape surround the core; and finally the combination is fed to an extruder for applying an outer jacket of thermoplastic material, such as polyethylene. Since waterproofing is usually required, the core is normally filled with a filling compound such as INSOJELL C-3589, which is a trade name of a filling compound produced and supplied by Dussek Campbell Limited.

When plastic coated metal tapes, such as Zetabon (trade name of Dow Chemical), are spliced, the original plastic coating is removed from the ends to be spliced, which ends are then spot welded to one another. Customer and industry specifications require that the coating be restored in the spliced area. The current method of restoring the coating is to use an iron-like device to melt the recoating tape onto the metal, thereby providing a heat sealing of the polymer coating to the splice by application of heat and pressure. An example of such method is disclosed, for example, in U.S. Pat. No. 4,319,938. Such heat sealing is time consuming and requires special heat sealing equipment, resulting in additional capital expenditure. It is also greatly dependent on operator's expertise since the amount of heat, pressure and time of application are very much a factor in the satisfactory recoating and are directly controlled by the operator.

SUMMARY OF THE INVENTION

To obviate the above problems and to simplify the splice overcoating procedure, the present invention proposes the use of an adhesive tape that can be directly applied to the splice area and provide the repaired recoating thereof.

The adhesive tape for overcoating splices in polymer coated metal tapes in accordance with the present invention comprises:

(a) a plastic film that serves as recoating material for the splices;

(b) a layer of adhesive applied to one face of said plastic film which will adhere to a metal surface to be recoated, and which is crosslinkable by application of heat; and (c) a releasing tape covering the adhesive layer without forming a strong bond to the adhesive during storage and which can be readily pealed-off from the adhesive when required.

The method for recoating splices in polymer coated metal tapes comprises removing the releasing tape from the adhesive tape; applying the so uncovered adhesive surface of the tape against the splice portion of the metal tape having no polymer coating thereon; and crosslinking the adhesive by application of heat.

The invention will be fully understood when reference is made to the following detailed description taken in conjunction with the accompanying drawings.

BRIEF DESCRIPTION OF THE DRAWINGS

FIG. 2 is a perspective view of a spliced metal tape to be recoated and two pieces of adhesive tape about to be used to coat the spliced metal tape;

FIG. 3 is a perspective view of the adhesive tape being installed on the spliced metal tape to be recoated;

FIG. 4 is a perspective view of a cable core surrounded by the recoated metal tape following the corrugation step; and FIG. 5 is a cross-sectional view of a completed cable with an extruded plastic jacket surrounding the recoated metal tape.

DETAILED DESCRIPTION OF THE INVENTION

Figure 1:
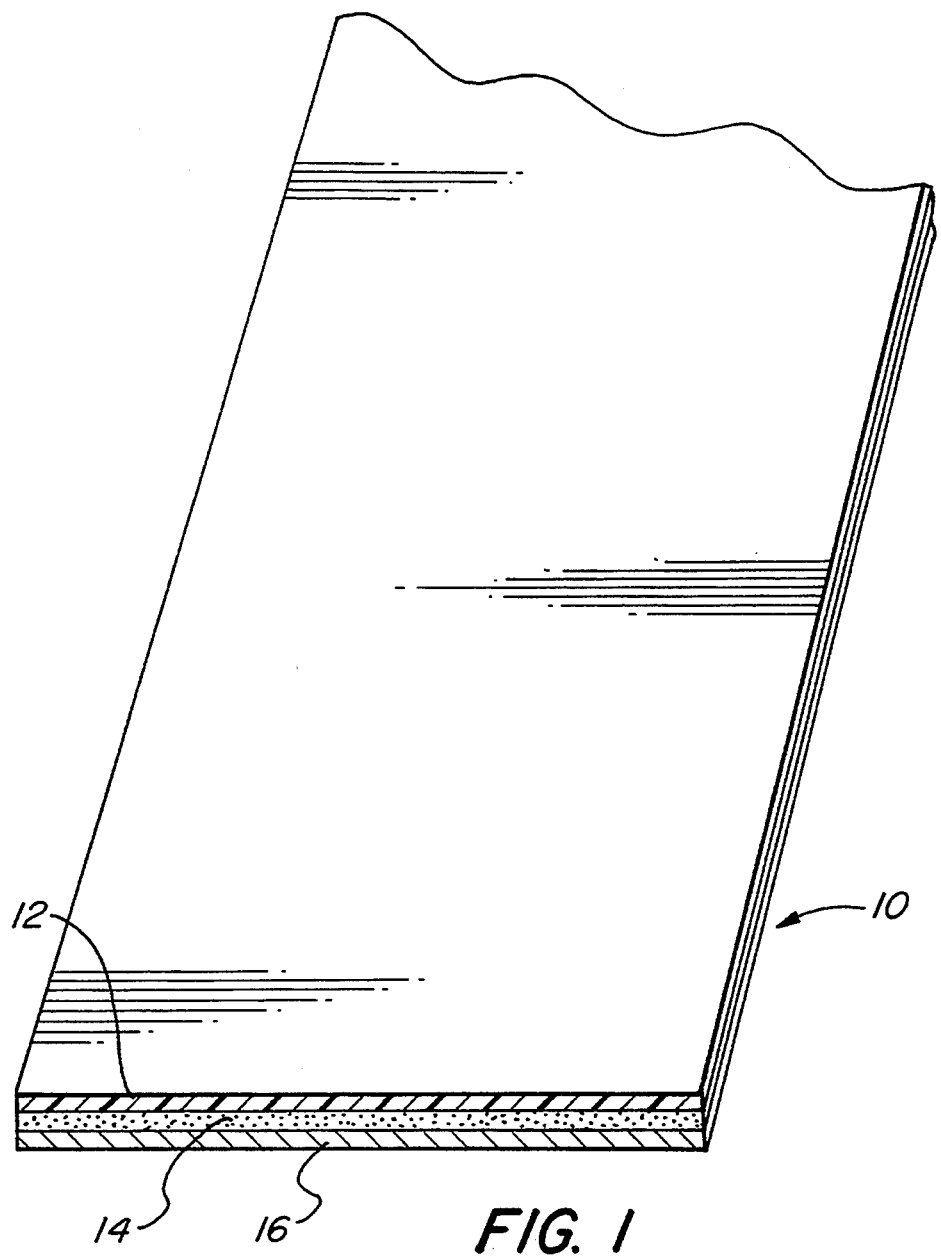
FIG. 1 is a perspective view of the structure of the adhesive tape of the present invention used for overcoating of splices.

In FIG. 1 of the drawings, the adhesive tape 10 for overcoating splices in polymer coated metal tapes is illustrated. It comprises a recoating tape or film 12, a layer of adhesive 14 and a releasing tape or release sheet 16 such as the silicone coated paper tape. The silicone coat of this tape 16 is applied against the adhesive 14 so as to protect the same, but without forming a very strong bond with the adhesive during storage.

When used, the release tape 16 is first peeled off as shown in FIG. 2 and discarded and the uncovered surfaces of the adhesive 14 are applied against non-coated metal splice areas 18 on both sides of a polymer coated metal tape material 20. The recoating tape 10 adheres to the polymer coated metal tape material 20 with the recoating tape 10 thereby covering the areas 18 as shown in FIG. 3. The non-coated metal splice areas 18 could include a weld 21. Then, as shown in FIG. 4, the polymer coated metal tape material 20 with the recoating tape 10 thereon continues to proceed through normal shielding operations where it is corrugated around a cable core 22 such as a plurality of insulated metal conductors 23. The normal shielding process culminates in a jacketing operation as shown in FIG. 5 where a jacket 24 is extruded around the polymer coated metal tape 20 and the recoating tape 10 to provide mechanical protection to the completed cable 26. During the jacket extrusion, melted thermoplastic material, such as polyethylene, forms the jacket 24 and the heat from the melted material causes the adhesive 14 to crosslink thereby producing a satisfactory bond between the non-coated metal splice area 18 and the recoating tape 10. The bond passes the delamination requirements of the original coated metal tape.

The recoating material or film 12 can be any thermoplastic polymer film that is compatible with the adhesive 14, i.e. will not cause premature degradation of the adhesive 14 and vice-versa, and will bond to the cable jacket 24 applied subsequent to recoating of the splice. The most commonly used material is an ethylene/acrylic acid (EAA) copolymer film, such as sold under the designation DAF 628 by the Dow Chemical Company. Other suitable thermoplastic polymers include, but not by way of limitation, ethylene vinyl acetate (EVA), polyethylene (PE) and polyvinylchloride (PVC).

The thickness of the recoating film 12 is dependent on the application. Thicknesses between 0.0005" and 0.025" (0.01 mm and 0.6 mm) are acceptable. The most common thickness would be between about 0.001" and 0.004" (0.025 mm and 0.1 mm).

The adhesive 14 applied to the recoating tape 12 may be any adhesive that is compatible with the tape 12, has the required viscosity when applied to such film 12, is resistant to cable filling and flooding compounds and, of course, provides a positive bond to the metallic tape 20 in the area 18 of the splice. The adhesive 14 must also be crosslinkable by application of heat. An example of such adhesive is TIMMINCO S0984 which is a trade name of a self-crosslinking acrylic polymer adhesive supplied by Timminco Ltd.

The releasing tape 16 could comprise any suitable tape that would not form a permanent bond with the adhesive 14 when stored for at least one year. Usually, it would comprise a release paper commonly used for similar applications. For example, it could be formed of three layers namely, a bleached paper sandwiched between two layers of polyethylene and one side of which is treated with silicone. The silicone treated side is placed against the adhesive surface on the splice recoating tape so as not to form a strong bond between said adhesive surface and the releasing tape. A good example of such releasing paper tape is HP Smith 8024 supplied by H. P. Smith Company.

It will be appreciated that the method of overcoating splices with such recoating adhesive tapes is very simple and efficient and avoids all the previously mentioned disadvantages found in the prior art. It is also much faster than the presently used heat sealing method.

It should be understood that the preferred embodiment described above is by no means limitative and that modifications obvious to those skilled in the art can be made without departing from the spirit of the invention and the scope of the following claims.

What is claimed is:

1. A method for recoating splices in polymer coated metal tapes, which comprises the steps of:
   (a) providing a polymer coated metal tape with a non-coated metal splice area;
   (b) providing an adhesive tape for overcoating the non-coated metal splice area of the polymer coated metal tape, the adhesive tape comprising:
      (i) a plastic film that serves as recoating material for the non-coated metal splice area,
      (ii) a layer of adhesive applied to one face of said plastic film which will adhere to the non-coated metal splice area to be recoated, and which is crosslinkable by application of heat, and
      (iii) a release sheet covering the adhesive layer without forming a strong bond to the adhesive during storage and which can be readily peeled-off from the adhesive when required;
   (c) removing the release sheet from the adhesive tape to provide an uncovered adhesive surface;
   (d) applying the uncovered adhesive surface of the adhesive tape against the non-coated metal splice area of the metal tape; and
   (e) crosslinking said adhesive by application of heat.

2. A method according to claim 1, in which said cross-linking is effected as a result of a subsequent cable jacketing operation.

3. A method according to claim 1, in which the polymer coated metal tape is a plastic coated aluminum tape.

4. A method according to claim 1, in which the plastic film that serves as recoating material is a thermoplastic polymer compatible with the adhesive and capable of being bonded to a cable jacket which is applied subsequent to recoating of the non-coated metal splice area.

5. A method according to claim 4, in which said plastic film is an ethylene/acrylic acid copolymer film.

6. A method according to claim 4, in which said plastic film is a film selected from the group consisting of ethylene vinyl acetate, polyethylene and polyvinylchloride.

7. A method according to claim 1, in which said plastic film has a thickness of between about 0.0005 in and 0.025 in (0.01 mm and 0.6 mm).

8. A method according claim 1, in which said plastic film has a thickness of between about 0.001 in and 0.004 in (0.025 mm and 0.1 mm).

9. A method according to claim 1, in which said adhesive is resistant to cable filling and flooding compounds with which the polymer coated metallic tapes are used and, when applied, provides a positive bond to the metallic tape in the non-coated metal splice area.

10. A method according to claim 9, in which said adhesive is a self-crosslinking acrylic polymer adhesive.

11. A method according to claim 1, in which the release sheet is formed of three layers comprising a layer of bleached paper sandwiched between two layers of polyethylene, with one side thereof being treated with silicone, said side treated with silicone being applied against the adhesive surface.

* * * * *

UNITED STATES PATENT AND TRADEMARK OFFICE
CERTIFICATE OF CORRECTION

PATENT NO. : 5,427,643
DATED : June 27, 1995
INVENTOR(S) : Aitken et al.

It is certified that error appears in the above-indentified patent and that said Letters Patent is hereby corrected as shown below:

On the title page, item [54], and column 1:

The title should be:

--Method of Using an Adhesive Tape for Overcoating Splices in Polymer Coated Metal Tapes--.

Signed and Sealed this

Twelfth Day of September, 1995

Attest:

BRUCE LEHMAN

Attesting Officer

Commissioner of Patents and Trademarks